United States Patent
Schiedermeier et al.

(10) Patent No.: US 11,279,244 B2
(45) Date of Patent: Mar. 22, 2022

(54) ELECTROPLATED AC CHARGER WITH MONITORING AND DIAGNOSTIC SYSTEM

(71) Applicant: AUDI AG, Ingolstadt (DE)

(72) Inventors: Maximilian Schiedermeier, Ingolstadt (DE); Tobias Graßl, Denkendorf (DE)

(73) Assignee: AUDI AG, Ingolstadt (DE)

( * ) Notice: Subject to any disclaimer, the term of this patent is extended or adjusted under 35 U.S.C. 154(b) by 6 days.

(21) Appl. No.: 17/016,148

(22) Filed: Sep. 9, 2020

(65) Prior Publication Data

US 2021/0070183 A1 Mar. 11, 2021

(30) Foreign Application Priority Data

Sep. 10, 2019 (DE) .......................... 102019124213.4

(51) Int. Cl.
*B60L 53/16* (2019.01)
*B60L 53/62* (2019.01)

(52) U.S. Cl.
CPC ............... *B60L 53/16* (2019.02); *B60L 53/62* (2019.02)

(58) Field of Classification Search
CPC .................................. B60L 53/16; B60L 53/62
USPC ......................................................... 320/120
See application file for complete search history.

(56) References Cited

U.S. PATENT DOCUMENTS

| | | | | |
|---|---|---|---|---|
| 2009/0103341 A1* | 4/2009 | Lee | .......................... | B60L 53/24 363/124 |
| 2012/0140371 A1* | 6/2012 | Gaul | ...................... | H02J 7/0027 361/93.6 |
| 2012/0286742 A1* | 11/2012 | Ichikawa | ............. | H04B 5/0012 320/137 |
| 2016/0099569 A1* | 4/2016 | Rilling | ...................... | H02J 3/38 307/125 |
| 2016/0245847 A1* | 8/2016 | Haas | ...................... | H02H 3/334 |
| 2018/0037124 A1* | 2/2018 | Jang | ...................... | B60L 53/122 |
| 2019/0143822 A1* | 5/2019 | Malek | ............... | H02M 3/33584 320/109 |
| 2019/0184833 A1* | 6/2019 | Elshaer | ...................... | H02J 7/02 |
| 2019/0270417 A1* | 9/2019 | Spesser | ................. | B60R 16/033 |
| 2019/0371557 A1* | 12/2019 | Haslinger | ................ | H02H 3/08 |
| 2020/0070677 A1* | 3/2020 | Spesser | ................... | B60L 53/62 |

FOREIGN PATENT DOCUMENTS

| | | | | |
|---|---|---|---|---|
| DE | 101 13 081 C1 | 4/2002 | | |
| DE | 10 2009 034 887 A1 | 2/2011 | | |
| DE | 10 2010 048 673 A1 | 4/2012 | | |
| DE | 102010048673 A1 * | 4/2012 | ............ | B60L 3/0069 |
| DE | 10 2010 062 369 A1 | 6/2012 | | |
| DE | 10 2017 202 236 A1 | 6/2017 | | |
| DE | 102018008603 A1 * | 5/2019 | .............. | B60L 58/10 |
| DE | 102019005476 A1 * | 4/2020 | .............. | H02M 7/25 |
| DE | 102018129413 A1 * | 5/2020 | .............. | B60L 53/16 |

(Continued)

OTHER PUBLICATIONS

Embedded Systems Design Blog; "Zener vs Schottky vs Normal diode"; Oct. 8, 2013; URL=https://embeddeddesignblog.blogspot.com/2013/10/zener-vs-schottky-vs-normal-diode.html; download date: Oct. 9, 2020; 11 pages.

*Primary Examiner* — Suresh Memula
(74) *Attorney, Agent, or Firm* — Seed IP Law Group LLP

(57) ABSTRACT

A galvanically connected AC charger is provided having a monitoring and diagnostic system for the AC charging of an electric, fuel cell or hybrid vehicle.

10 Claims, 2 Drawing Sheets

(56) References Cited

FOREIGN PATENT DOCUMENTS

| DE | 102020004741 | A1 | * | 11/2020 | ............... B60L 53/20 |
| DE | 102020111355 | A1 | * | 12/2020 | .......... H02M 1/4208 |
| DE | 102019008824 | A1 | * | 1/2021 | ................. B60L 1/00 |
| EP | 2800231 | A1 | * | 11/2014 | ............... H02J 3/322 |
| WO | WO-2014112925 | A1 | * | 7/2014 | ............... B60L 53/14 |
| WO | WO-2019170457 | A1 | * | 9/2019 | ................ B60L 3/04 |
| WO | WO-2020169575 | A1 | * | 8/2020 | ............... B60L 53/11 |
| WO | WO-2021122236 | A1 | * | 6/2021 | ............. B60L 1/003 |

* cited by examiner

ELECTROPLATED AC CHARGER WITH MONITORING AND DIAGNOSTIC SYSTEM

BACKGROUND

Technical Field

The present disclosure relates to a galvanically connected AC charger having a monitoring and diagnostic system for the AC charging of an electric, fuel cell or hybrid vehicle.

Description of the Related Art

Chargers which have a galvanic separation, generally via a transformer, for separating the AC power source (AC mains, grid) from the DC mains of the vehicle, are usually used for the AC charging of electric vehicles. The additional transformer utilized for the galvanic separation and the likewise power electronics cause additional energy losses, use additional installation space, and cause additional costs. In addition, some of the functional units of the charger are separated from one another by increased or double insulation. However, increased insulation is associated with additional expenditure and additional space consumption compared to a basic insulation A second type of charger for electric, fuel cell, and hybrid vehicles does not include galvanic isolation in the power path and is therefore referred to as a galvanically connected AC charger. Due to standard specifications, even more functional units of the charger will however have an increased insulation class in these chargers than in a charger with galvanic separation.

DE 10 2017 202 236 A1 discloses a method for transmitting electrical energy from a charging interface to a high-voltage portion of a vehicle electrical system via a switching assembly with galvanic coupling. The switching assembly is monitored for fault currents which are above a predefined triggering threshold value of a fault current fuse, in order to prevent leakage currents during the charging process.

DE 10 2010 048 673 A1 discloses a vehicle with a galvanically coupled electrical on-board wiring system and an all-current-sensitive fault current protective device. The fault current protection device interrupts an electrical connection of the on-board wiring system to a charging terminal when a current difference above a predefined threshold value is detected.

DE 10 2009 034 887 A1 relates to a charging station for supplying electrical energy to an electric vehicle with a safety and monitoring device. The safety and monitoring device has a fault current monitoring means which monitors the occurrence of both AC and DC fault currents.

BRIEF SUMMARY

Embodiments of the present disclosure provide an intelligent diagnostic system for a charger with a galvanically connected power section, by means of which conformity with standards can be achieved without higher classes of insulation.

Embodiments of the present disclosure provide an AC charger without galvanic separation for a high voltage (HV) energy accumulator of an electric, fuel cell or hybrid vehicle. According to principles of the present disclosure, all assemblies of a high-voltage portion of the AC charger are insulated from a low-voltage mains and a protective conductor of the AC charger only by a base insulation. Overvoltage protection is provided between the low-voltage mains and the protective conductor, and at the AC input of the AC charger there is an all-current-sensitive fault current protective device via which the AC charger can be connected to an AC power source.

IEC 60664, in which minimum standards are specified for voltages up to 1000 VAC/1500VDA and nominal frequencies up to 30 kHz, is the fundamental standard for insulation materials in low-voltage applications. In IEC 60664, principles of material suitability for electrical insulations are described.

In the following list, a few terms are explained which are to be considered when designing a device from the viewpoint of the insulating material. They are all mentioned in IEC 60664 and in their entirety give a specific set of standards depending on the application and installation location of the electrical device.

The base insulation prevents the contact of conductors or conductive parts which are under voltage in normal operation. This base insulation may be removable only by destruction. The base insulation provides basic protection against electrical shock. The base insulation differs from a double or reinforced insulation in that its strength is lower. That is, the maximum breakdown voltage which the base insulation has to withstand is lower. In practice, this leads, for example, to the fact that thinner insulating materials or smaller air and creepage paths can be applied.

Assemblies with higher insulating classes, for example, have additional insulation as a second protective barrier, i.e., have a double insulation. In this case, the base insulation and the additional insulation are two layers separated from one another. Each layer satisfies the basic protection against electrical shock.

Alternatively, assemblies with higher insulation classes have increased insulation: This insulation consists of a uniform insulating system. It provides protection equivalent to double insulation. If it consists of a plurality of layers (multilayer laminates); these are not separably connected to one another and cannot be tested individually.

According to the disclosure, a monitoring device or a defined discharge impedance is implemented in the AC charger for the case of a fault in order to achieve conformity with standard IEC 60664 despite the low insulation class of the components in the high-voltage component.

All in all, however, it can be said that the double or increased insulation in each case has air and creepage paths that are the same as the base insulation. The test voltage with which these insulations are checked is also higher than that of the base insulation.

An all-current-sensitive fault current protection device is implemented in the AC charger according to the disclosure. In one embodiment, an RCD type B is used as the all-current-sensitive fault current protection device. This opens up the possibility of being able to insulate the high-voltage regions (both AC- and DC-side) by means of base insulation of the protective conductor (as housing of the HV components, as well as body potential, and protective conductor of the mains). The challenge is now to ensure that in case of an insulation failure, there is no danger of HV to the low voltage range (e.g., a 12 V range).

The fault current circuit breaker triggers at the latest when the rated fault current is reached and switches the affected circuit off from the upstream network for all poles, including the neutral conductor in the case of four-pole switches. The protective conductor is not a component of the fault current circuit breaker and is not switched off.

For additional detection of smooth direct error currents, all-current-sensitive RCDs (e.g., type B) have in part a second transducer core, which can be equipped with a Hall sensor to detect the magnetic field directly, and/or still further electronics in order to better detect (or fade out) frequency responses and their current dependencies, for example.

In one embodiment, the impedance at overvoltage is reduced in a defined manner via a corresponding circuit of the LV pins within a component to such an extent that, in any fault case, an overcurrent of sufficient value arises which triggers a switch-off process by the RCD type B.

This circuit may be composed of resistors, semiconductor elements such as Zener diodes, Schottky diodes, suppressor diodes (also called transient absorption Zener diode (TAZ diode) transient voltage suppressor diode (TVS diode)), other protection diodes or similar elements, other passive or active components, or a combination thereof.

On the one hand, this circuit produces a discharge current which allows the RCD type B to be triggered. On the other hand, the voltage is limited, for example to a value of <60 V. The voltage is thus below the contact protection minimum voltage in the event of a fault. Standards conformity is achieved.

In one embodiment, the overvoltage protection comprises a discharge impedance. In a further embodiment, the discharge impedance limits the overvoltage to a value of less than 60 V. The discharge impedance thus offers an additional protective effect, since the voltage can be kept low by the discharge of the current in the event of an insulation fault.

In one embodiment, the discharge impedance is a Schottky diode. In another embodiment, the discharge impedance is a suppressor diode. In yet another embodiment, the discharge impedance is a Zener diode.

A further embodiment of the AC charger according to the disclosure comprises a combination of different functional elements which improve safety, inter alia in terms of fail safety and triggering dynamics.

In one embodiment, a shunt for measuring a discharge current is arranged between the discharge impedance and the protective conductor. The shunt measurement can be used to determine the discharge current and to use it as a detection threshold.

In the context of the present disclosure, the term shunt refers to a current measuring resistor, i.e., low-impedance electrical measuring resistor, which can be equipped with separate current and voltage terminals, and is inserted directly into the current-carrying line. Only a negligibly small current is discharged by the voltage measuring device connected in parallel to this shunt.

In a further embodiment, the AC charger additionally comprises means for monitoring a voltage between an LV signal and the protective conductor and means for monitoring the discharge current through the shunt. In a particular embodiment, the means for monitoring the voltage between the LV signal and the protective conductor and the means for monitoring the discharge current through the shunt are designed to trigger the all-current-sensitive fault current protection device when a predetermined threshold value of the voltage between the LV signal and the protective conductor or a predetermined threshold value of the discharge current is exceeded.

In one embodiment, the overvoltage protection includes error voltage monitoring configured to detect an overvoltage at each LV signal that is routed to or exits the high voltage portion of the AC charger via an LV plug, and trigger the all-current-sensitive fault current protective device when the overvoltage exceeds a predetermined threshold. Examples of such LV signals include signals from bus systems such as terminal 30, terminal 15, CAN, FlexRay or the like. In this case, if a voltage which lies above a defined threshold is detected, this is reported to the RCD type B, which then intervenes and brings the system into a safe state.

The advantages of the AC charger according to the disclosure include that the galvanic separation is eliminated, as a result of which the AC charger becomes lighter, smaller and cheaper, and that only little additional circuitry is used to achieve conformity with standards.

Since the energy stored in LV capacitors of the AC charger is limited and the maximum voltage is <60 V, safety for the user is improved. The design of the AC charger according to the disclosure also prevents the circuit breaker from being triggered by a fault current which flows through the user, since a current flow via the protective circuit occurs immediately in the event of a fault. This means increased safety and avoidance of a situation which is unacceptable or uncomfortable for the user in the event of a fault.

Additional advantages and embodiments of the present disclosure are apparent from the description and the accompanying drawings.

It goes without saying that the features mentioned above and the features yet to be explained below can be used not only in the combination specified in each case but also in other combinations or alone, without departing from the scope of the present disclosure.

DETAILED DESCRIPTION

Figure 1:
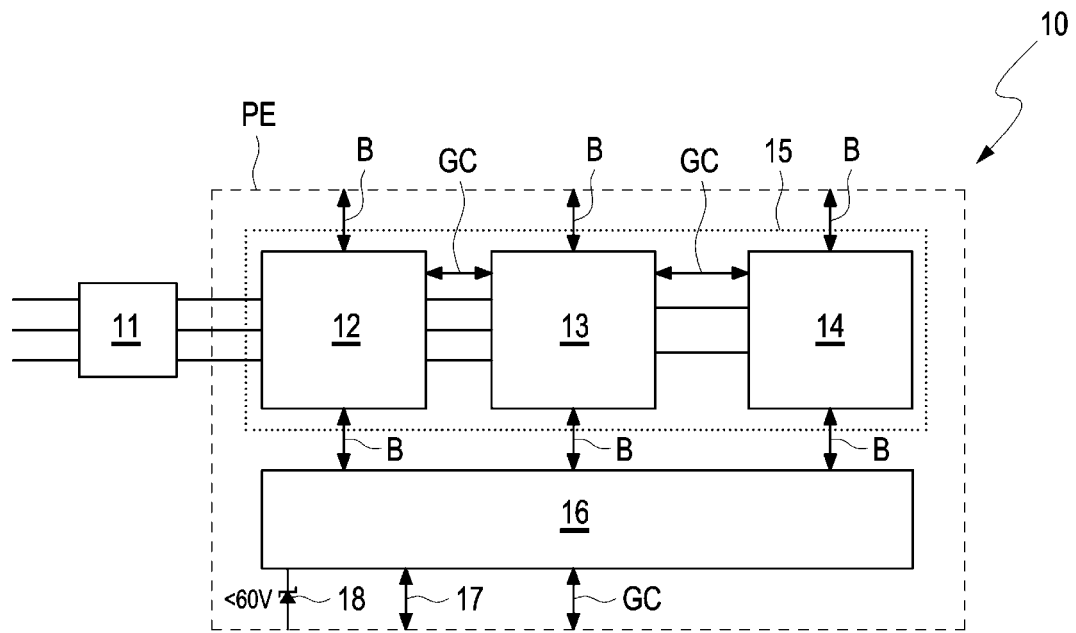
FIG. 1 shows a first embodiment of an AC charger.

FIG. 1 schematically shows an embodiment of the AC charger 10 according to principles of the present disclosure. The dashed area symbolizes the housing of the AC charger, which is connected to a protective conductor PE. The connection between an AC voltage source, e.g., the AC mains, and the AC charger 10 is via a circuit breaker (RCD type B) 11. Within the AC charger are various assemblies 12, 13, 14, 15 which perform different tasks. The AC side assemblies with mains filter 12, rectifier/power electronics 13 and HV DC network 14 are electrically connected conductively in series to each other and form the high voltage part 15 (HV portion) of the AC charger 10. The low-voltage mains 16 module forms the low-voltage portion (LV portion) of the AC charger 10 and comprises, for example, a 12 V on-board electrical system, a CAN bus, etc. The modules 12, 13 and 14 have a ground connection GC, i.e., are at the same potential. The low-voltage mains 15 has a ground connection GC with the protective conductor PE. The assemblies 12, 13, 14 of the high-voltage portion are insulated from the protective conductor PE and from the assembly 16 by a base insulation B. Thus, no increased or double insulation is used.

In order that no danger arises in the event of an insulation failure of the high-voltage portion 15 from the low-voltage portion 16, the AC charger 10 has an overvoltage protection 17 between the assembly 16 and the protective conductor PE. Via a circuit of the LV pins within the low-voltage mains 16 to a Schottky diode 18, the impedance at overvoltage is reduced in a defined manner to such an extent that, in the event of an error, a sufficiently-great discharge current arises which allows the circuit breaker 11 to trigger. In addition, the voltage is limited to <60 V. The voltage is thus below the contact protection minimum voltage in the event of a fault. Standards conformity is achieved.

Figure 2:
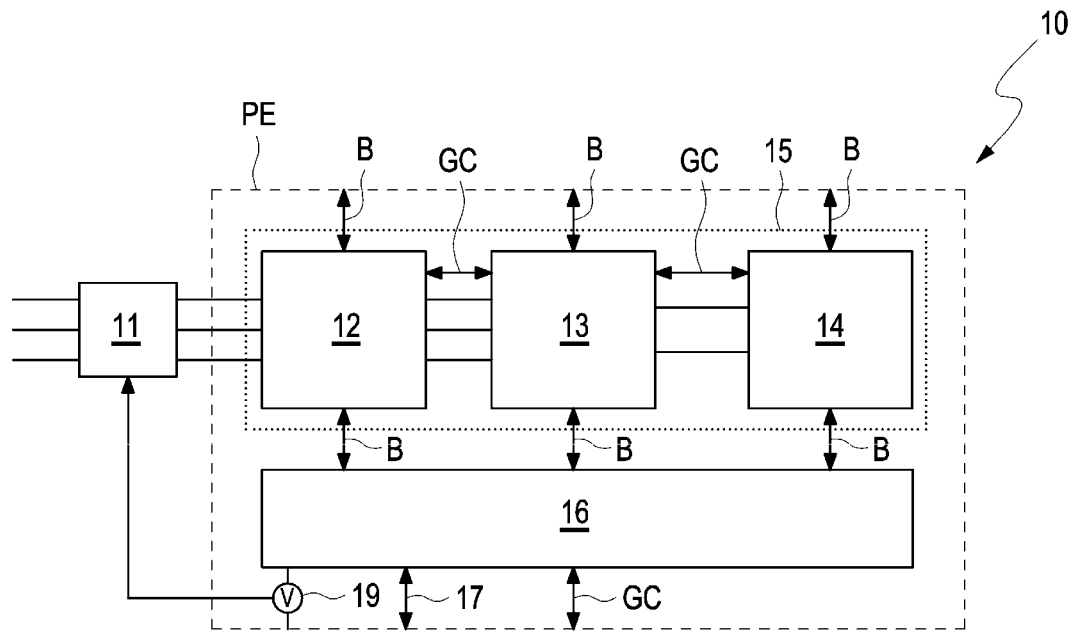
FIG. 2 shows a second embodiment of an AC charger.

FIG. 2 shows an alternative embodiment of the AC charger 10 according to the disclosure. An error voltage monitor 19 detects an overvoltage at each LV signal, which is conducted via an LV plug into the high-voltage portion 15 (HV portion) or leaves the HV portion 15 (e.g., terminal 30, terminal 15, CAN, FlexRay or the like). If a voltage which is above a defined threshold is detected in this case, this is reported to the circuit breaker 11, which then intervenes and brings the system into a safe state.

Figure 3:
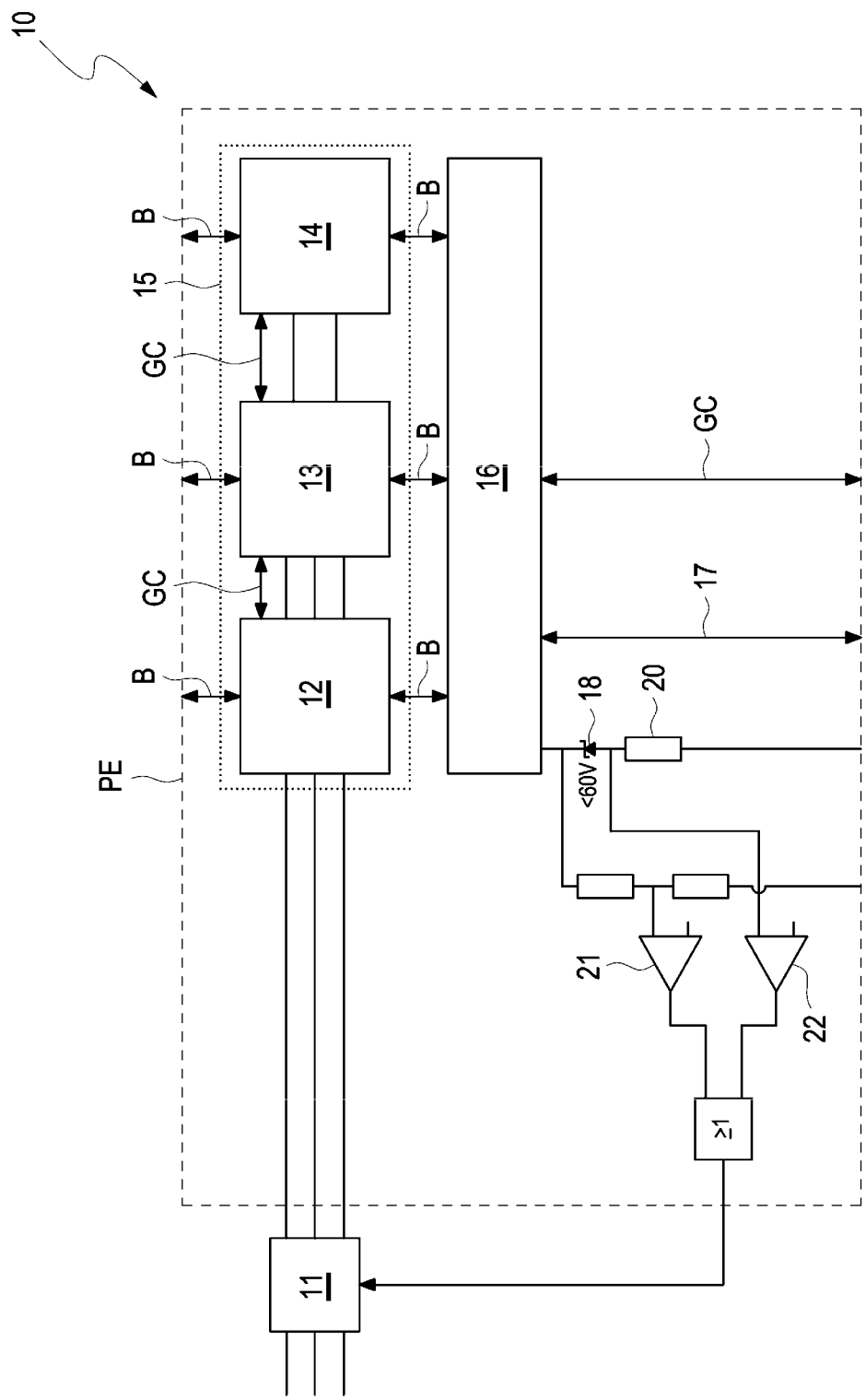
FIG. 3 shows a third embodiment of an AC charger.

FIG. 3 shows a third embodiment of the AC charger 10 according to the disclosure. In this embodiment, a combination of measures is used to improve safety, inter alia in terms of fail safety and triggering dynamics. In addition to a defined discharge impedance 18 (e.g., Zener diode, Schottky diode, suppressor diode or the like) a shunt 20 is present. The discharge current can be determined via the current measurement by the shunt 20 and used as a detection threshold. Further, the voltage between the LV signal and the protective conductor PE can be detected. If a threshold exceedance of either voltage monitoring 21 or current monitoring 22 occurs, this is transmitted to circuit breaker 11. This then leads to a safe state by disconnection. Also, the discharge impedance 18 provides an additional protective measure since the voltage can be kept low by the discharge of the current in the event of an insulation fault.

This application claims priority to German patent application no. 10 2019 124 213.4, filed Sep. 10, 2019, which is hereby incorporated herein by reference in its entirety.

Aspects and features of the various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. An AC charger without galvanic separation for an HV energy accumulator of an electric, fuel cell or hybrid vehicle, the AC charger comprising:
an alternating current input via which the AC charger can be connected to an AC power source;
a low-voltage mains;
a protective conductor;
a high voltage portion including a plurality of assemblies each insulated from the low-voltage mains and the protective conductor only by a base insulation;
an overvoltage protection provided between the low-voltage mains and the protective conductor; and
an all-current-sensitive fault current protection device located at the alternating current input.

2. The AC charger according to claim 1, wherein the overvoltage protection includes a discharge impedance.

3. The AC charger according to claim 2, wherein the discharge impedance limits the overvoltage to a value of less than 60 V.

4. The AC charger according to claim 3, wherein the discharge impedance is a Schottky diode.

5. The AC charger according to claim 3, wherein the discharge impedance is a suppressor diode.

6. The AC charger according to claim 3, wherein the discharge impedance is a Zener diode.

7. The AC charger according to claim 2, wherein a shunt for measuring a discharge current is arranged between the discharge impedance and the protective conductor.

8. The AC charger according to claim 7, further comprising means for monitoring a voltage between an LV signal and the protective conductor and means for monitoring the discharge current through the shunt.

9. The AC charger according to claim 8, wherein the means for monitoring the voltage between the LV signal and the protective conductor and the means for monitoring the discharge current through the shunt are designed to trigger the all-current-sensitive fault-current protective device when a predetermined threshold value of the voltage between the LV signal and the protective conductor or a predetermined threshold value of the discharge current is exceeded.

10. The AC charger according to claim 1, wherein the overvoltage protection includes an error voltage monitor that is designed to detect an overvoltage in each LV signal fed into or leaving an LV plug in the high voltage portion of the AC charger and trigger the all-current-sensitive fault current protection device when the overvoltage exceeds a predetermined threshold.

* * * * *